United States Patent
Ashby et al.

(10) Patent No.: US 12,080,849 B1
(45) Date of Patent: Sep. 3, 2024

(54) IONOGEL-BASED BATTERIES AND IONOGEL LIQUID EXCHANGE

(71) Applicant: National Technology & Engineering Solutions of Sandia, LLC, Albuquerque, NM (US)

(72) Inventors: David Scott Ashby, Livermore, CA (US); Albert Alec Talin, Dublin, CA (US); Katharine Lee Harrison, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 225 days.

(21) Appl. No.: 17/548,872

(22) Filed: Dec. 13, 2021

(51) Int. Cl.
    *H01M 10/0565* (2010.01)
(52) U.S. Cl.
    CPC ............ *H01M 10/0565* (2013.01); *H01M 2300/0085* (2013.01)
(58) Field of Classification Search
    CPC ............ H01M 10/0565; H01M 2300/0085
    See application file for complete search history.

(56) References Cited

U.S. PATENT DOCUMENTS

| | | | |
|---|---|---|---|
| 2015/0188189 A1* | 7/2015 | Armand | H01B 1/122 429/314 |
| 2017/0133714 A1* | 5/2017 | Ayme-Perrot | C08J 3/11 |
| 2020/0350570 A1* | 11/2020 | Kim | H01M 4/366 |
| 2021/0257659 A1* | 8/2021 | Park | H01M 10/0565 |

OTHER PUBLICATIONS

Ashby, et al., "Patternable, Solution-Processed Ionogels for Thin-Film Lithium-Ion Electrolytes", In Joule, vol. 1, No. 2, Oct. 11, 2017, pp. 344-358.
Wu, et al., "A Sol-Gel Solid Electrolyte with High Lithium Ion Conductivity", In Chemistry of materials, vol. 9, No. 4, 1997, pp. 1004-1011.

* cited by examiner

*Primary Examiner* — Stewart A Fraser
(74) *Attorney, Agent, or Firm* — Calfee, Halter & Griswold LLP; Madelynne Farber; Samantha Updegraff

(57) ABSTRACT

An ionogel is formed by mixture of precursors, a catalyst, and an ionic liquid to form a sol-gel. The precursors and the catalyst react to form a solid-phase matrix that includes pores, wherein the ionic liquid is disposed within the pores. The gel is dried by way of thermal or vacuum drying to remove liquid byproducts of the precursor-catalyst reaction and to form a solid-state ionogel that comprises the solid-phase matrix with the ionic liquid disposed therein. The ionogel is immersed in a quantity of a liquid electrolyte that is soluble in the ionic liquid. As the liquid electrolyte dissolves into the ionic liquid, the ionic liquid is displaced by the liquid electrolyte, yielding an ionogel having the liquid electrolyte disposed within its pores.

5 Claims, 5 Drawing Sheets

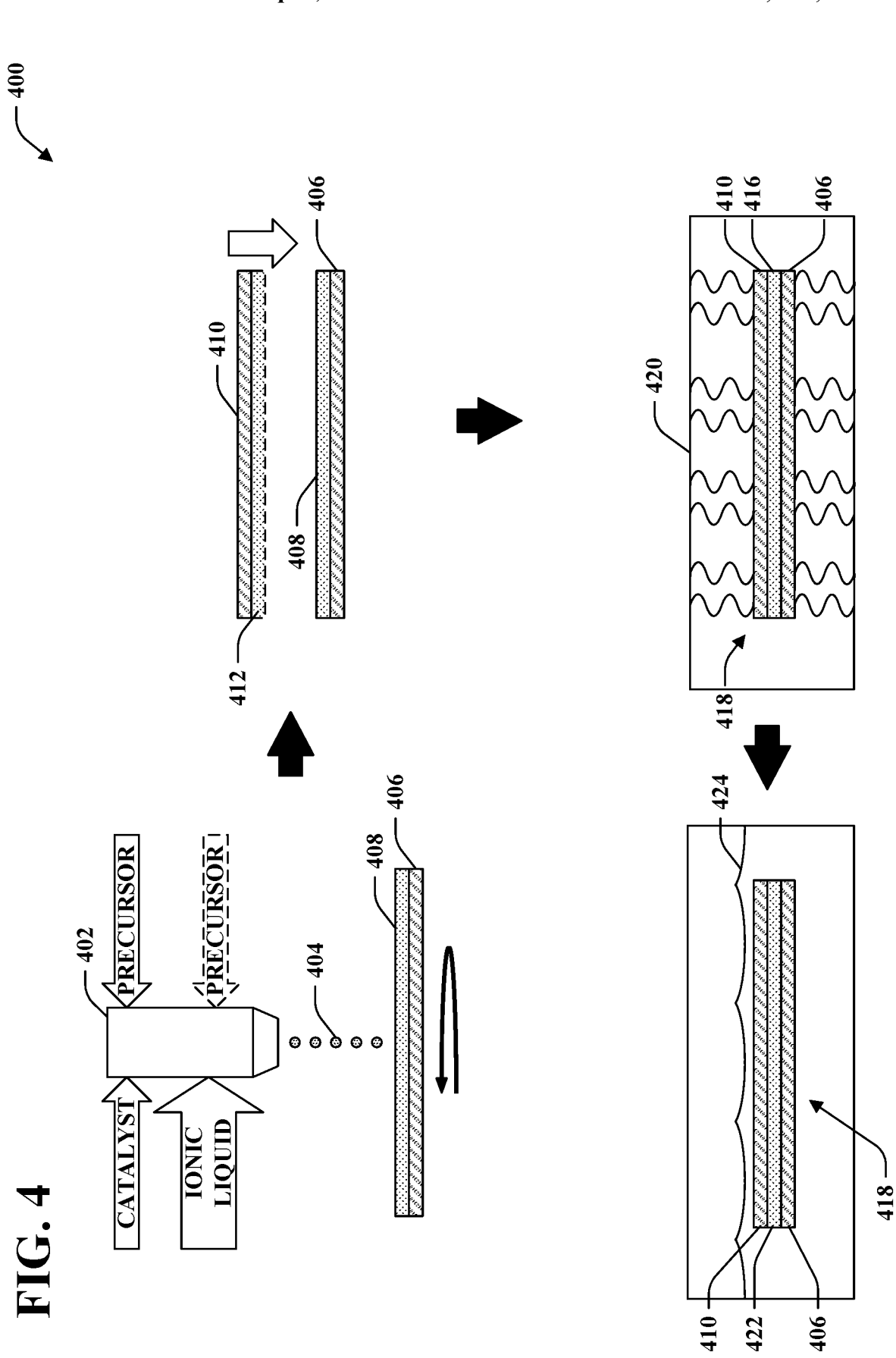

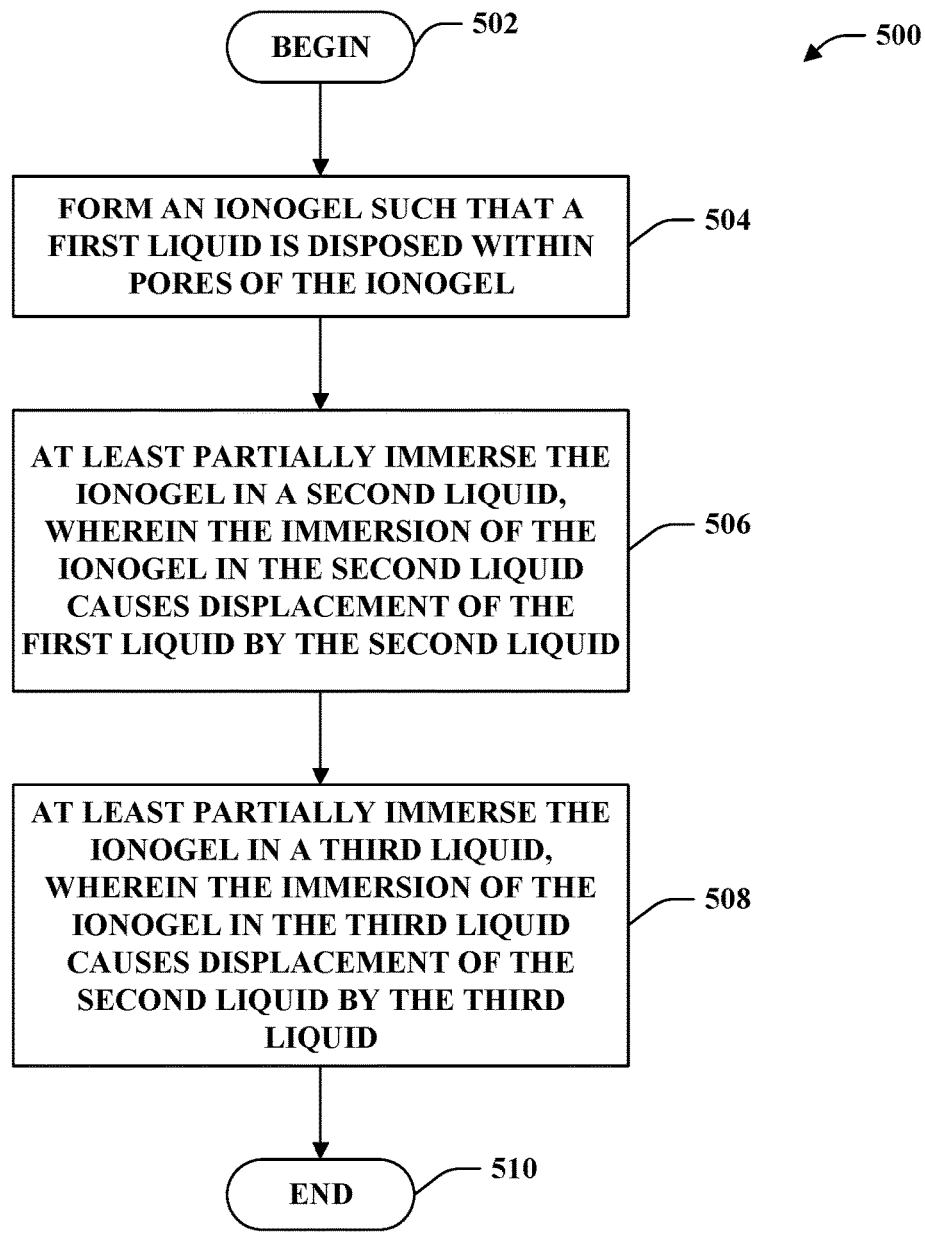

IONOGEL-BASED BATTERIES AND IONOGEL LIQUID EXCHANGE

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Lithium ion batteries have become important components of many devices and systems, including personal electronic devices, electric vehicles, and intermittent renewable energy systems (e.g., solar and wind power systems). Lithium ion batteries are commonly constructed with liquid electrolytes, which have various safety and reliability drawbacks. Solid-state lithium metal and lithium ion batteries are an emerging area of research interest due to potential safety and reliability advantages over liquid-electrolyte lithium ion batteries. These solid-state batteries can have disadvantages of poor solid state electrolyte (SSE) incorporation with cast electrodes, and high interfacial resistance between an SSE and electrodes due to interfacial reactions and poor interfacial contact.

Ionogels can be initially processed in a liquid phase and later solidified to a solid phase. An ionogel retains ion-transport characteristics that are similar to an ionic liquid but macroscopically behaves as a solid. In other words, an ionogel, once solidified, can be treated as a substantially solid state component. Conventionally, an ionogel is formed by mixing one or more matrix precursors with a liquid electrolyte and a catalyst. The reaction of the one or more precursors with the catalyst results in formation of a solid-phase matrix having pores formed therein, with the liquid electrolyte suspended in the pores of the matrix. The resulting ionogel has ion transport characteristics that are similar to those of the liquid electrolyte disposed therein.

For many common ionogel chemistries, water and/or various alcohols are produced as byproducts of the reaction used to form the solid-phase matrix. During formation of the solid-phase matrix, these byproducts are trapped within the pores of the matrix along with the liquid electrolyte. The presence of these byproducts can render an ionogel unsuitable for use in a lithium-ion battery due to incompatibility with common electrode chemistries or poor ion transport performance. However, conventional means of removal of such byproducts cannot be employed with some electrolytes that are well-suited to lithium ion batteries without simultaneously removing or destroying the liquid electrolyte trapped in the pores of the solid-phase matrix.

SUMMARY

The following is a brief summary of subject matter that is described in greater detail herein. This summary is not intended to be limiting as to the scope of the claims.

Various technologies relating to forming ionogels with application-tailored liquid electrolytes are described herein. Further, various technologies relating to forming an ionogel that is suitable for use in a lithium ion battery are described herein. An ionogel is formed such that the ionogel includes a solid-phase matrix having pores formed therein, and a first liquid disposed within the pores of the solid-phase matrix. In a non-limiting example, the ionogel can be formed by mixing liquid phases of a precursor, a catalyst, and the first liquid, wherein reaction of the precursor and the catalyst causes formation of the solid-phase matrix. In various embodiments, reaction of the precursor and the catalyst results in creation of a sol-gel that can be deposited onto an electrode or other component by way of spin-coating, jet printing, dip coating, or other mode of deposition. In such embodiments, forming the solid-phase matrix of the ionogel can further include drying the ionogel by way of vacuum drying or thermal drying, whereupon the sol-gel solidifies and the solid-phase matrix remains. During the drying of the ionogel, byproducts of the precursor-catalyst reaction such as water or various alcohols can be evaporated or drawn out of the ionogel.

Subsequent to forming the ionogel that includes the solid-phase matrix and the first liquid trapped in the pores of the matrix, the ionogel is at least partially immersed in a second liquid. In exemplary embodiments, the second liquid comprises an electrolyte that is desirably incorporated in the ionogel to affect its ion-transport characteristics. In various embodiments, the second liquid is soluble in the first liquid or the first liquid is soluble in the second liquid. During the immersion of the ionogel in the second liquid, the second liquid replaces the first liquid trapped in the pores of the matrix, thereby displacing the first liquid in the pores. Hence, after immersion of the ionogel in the second liquid, the second liquid and its electrolyte are disposed within pores of the solid-phase matrix.

In some embodiments, it may be that neither of the first or second liquids is soluble in the other. In these embodiments, prior to immersion of the ionogel in the second liquid, the ionogel can be at least partially immersed in an intermediate liquid in which both the first liquid and the second liquid are soluble. Immersion of the ionogel in the intermediate liquid causes the first liquid to dissolve into the intermediate liquid, whereby the intermediate liquid displaces the first liquid in the pores of the solid-phase matrix of the ionogel. The ionogel is then at least partially immersed in the second liquid, whereupon the second liquid dissolves into the intermediate liquid, thereby displacing the third liquid in the pores of the solid-phase matrix of the ionogel.

According to embodiments described herein, an ionogel that is suitable for use as an electrolyte in a lithium-ion battery can be created. For example, according to various embodiments described herein, an ionogel can be made that has an electrolyte solution of bis(fluoromethanesulfonyl) imide (LiFSI) dissolved in one or a combination of 1,3 dioxolane (DOL) or dimethyl ether (DME) disposed in the pores of the ionogel. In further non-limiting examples, by employment of the technologies described herein, an ionogel can be formed that has an electrolyte solution of lithium perchlorate ($LiClO_4$) dissolved in propylene carbonate disposed in the pores of the ionogel.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 is a pictorial diagram illustrating a process for making a battery that includes an ionogel electrolyte.

FIG. 5 is a flow diagram that illustrates another exemplary methodology for forming an application-tailored ionogel.

DETAILED DESCRIPTION

Figure 1:
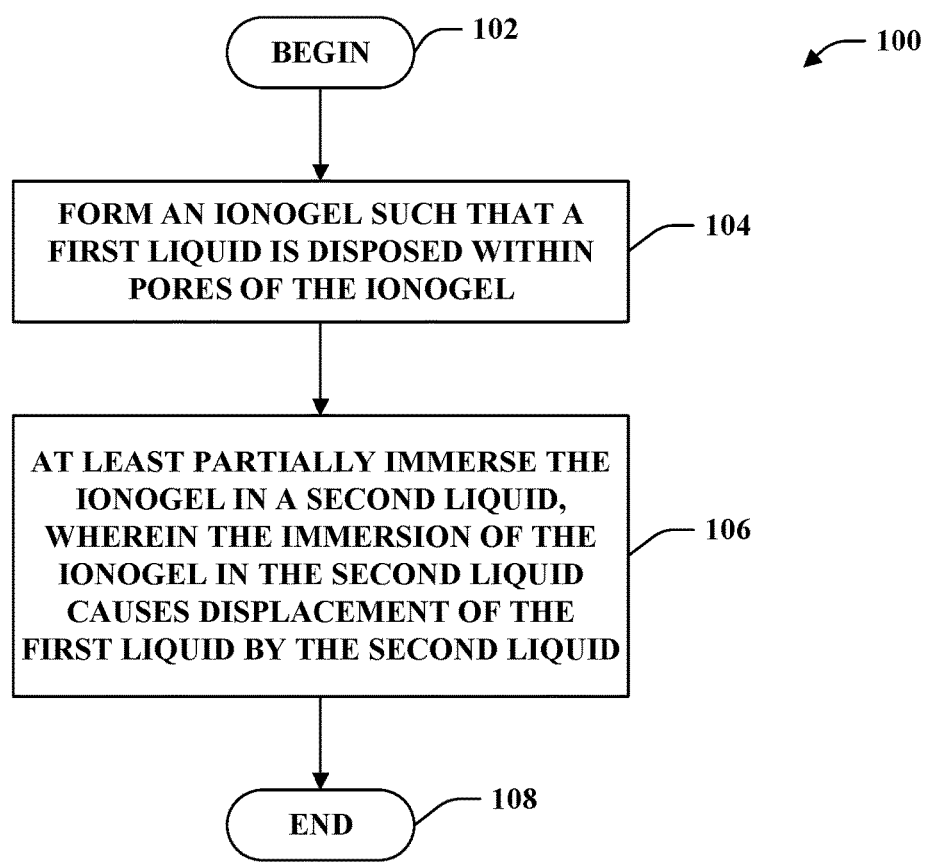
FIG. 1 is a flow diagram that illustrates an exemplary methodology for forming an application-tailored ionogel.

Various technologies pertaining to forming ionogels are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "immerse" or "immersion" are intended to refer to either complete or partial immersion in a substance, unless otherwise specified or apparent from context. Additionally, as used herein, the term "exemplary" is intended to mean serving as an illustration or example of something, and is not intended to indicate a preference.

FIGS. 1-3 and 5 illustrate exemplary methodologies relating to forming application-tailored ionogels and devices formed therefrom. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring now to FIG. 1, a methodology 100 that facilitates manufacturing an ionogel to include an application-tailored electrolyte is illustrated. As noted above, conventionally ionogels have been limited by the ability of their electrolytes to withstand conditions needed to eliminate detrimental byproducts of the ionogel formation process. For example, heating an ionogel to 100° C. or above in order to eliminate water and alcohol byproducts is sufficient to boil away some electrolytes. In other examples, exposure of an ionogel to ambient atmospheric pressure sufficiently low to cause evaporation of water or alcohol byproducts (e.g., a vacuum) is also sufficient to evaporate some electrolytes. Thus, various electrolytes that have otherwise-desirable properties have conventionally been unsuitable for inclusion in an ionogel.

The methodology 100 begins at 102, and at 104, an ionogel is formed such that the ionogel includes a solid-phase matrix and a first liquid that is disposed within pores formed in the solid-phase matrix. As will be described in greater detail below with respect to FIG. 2, the ionogel can be formed by mixing one or more precursors with a catalyst and the first liquid. Reactions among the precursors and the catalyst form a sol with the first liquid mixed therein. The mixture of the sol and the first liquid is referred to herein as a sol-gel. To form an ionogel, the sol-gel can be cast using a mold or can be deposited on a substrate (e.g., an electrode of a battery) by any of various methods including, but not limited to, spin coating, dip coating, jet printing, etc. As the sol-gel ages, the solid-phase matrix forms about the first liquid that is mixed with the sol in the sol-gel such that the first liquid is trapped within pores of the solid-phase matrix. Whereas the first liquid may be suitable for forming the ionogel such that the solid-phase matrix does not collapse, the first liquid may be poorly suited to a final desired application of the formed ionogel.

At 106, the ionogel is at least partially immersed in a second liquid, wherein the immersion of the ionogel in the second liquid causes displacement of the first liquid by the second liquid in the pores of the ionogel. The second liquid can be an electrolyte solution that has ion transport properties that are desirably imparted to the ionogel. In an exemplary embodiment, the second liquid can be an electrolyte solution that is soluble in the first liquid. In such embodiments, as the second liquid dissolves into the first liquid at least some of the first liquid is displaced by the second liquid. In other embodiments, the first liquid can be soluble in the second liquid.

The immersion of the ionogel in the second liquid at 106 can be repeated a plurality of times until a desired concentration of the second liquid and/or the electrolyte dissolved in the second liquid is reached within the pores of the ionogel. By way of example, and not limitation, at 106, the ionogel can be immersed in a first quantity of the second liquid, thereby causing displacement of a first portion of the first liquid by the second liquid in the pores of the ionogel. Continuing the example, the ionogel can then be immersed in a second quantity of the second liquid, causing displacement of a second portion of the first liquid by the second liquid in the pores of the ionogel. Further continuing the example, the ionogel can then be immersed in a third quantity of the second liquid, causing displacement of a third portion of the first liquid by the second liquid in the pores of the ionogel. In other words, the ionogel can be successively immersed in fresh quantities of the second liquid so as to facilitate further displacement of the first liquid in the pores of the ionogel by the second liquid, until a desired concentration of the second liquid is reached within the pores of the ionogel. At 108, the methodology 100 ends.

Figure 2:
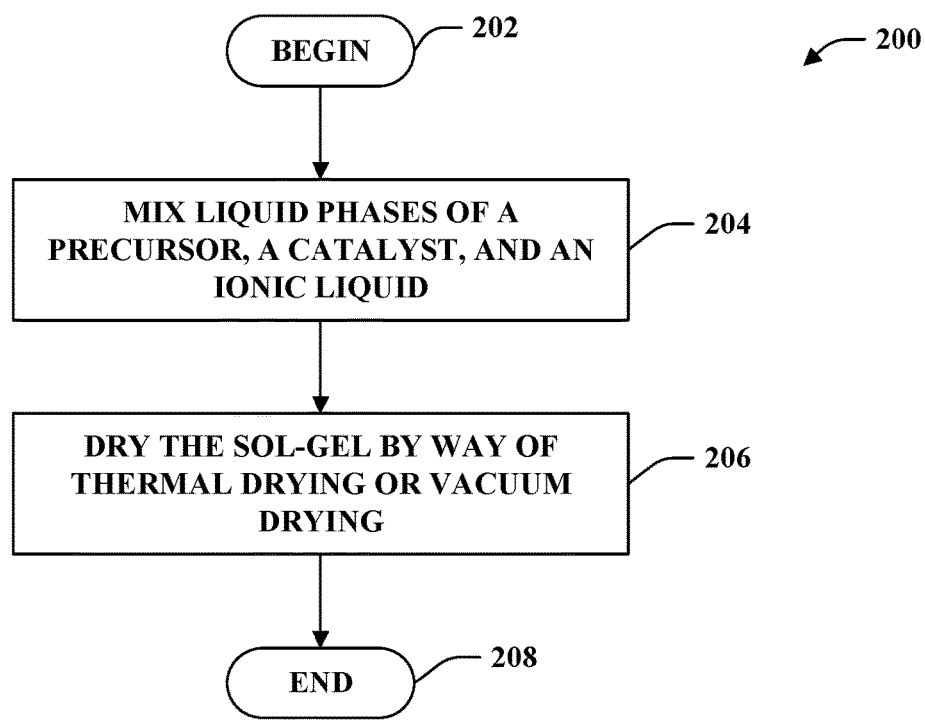
FIG. 2 is a flow diagram that illustrates an exemplary methodology for forming an ionogel.

Referring now to FIG. 2, an exemplary methodology 200 for forming an ionogel is illustrated. In an exemplary embodiment, forming the ionogel 104 in the methodology 100 described above can be accomplished according to the methodology 200 described herein. The methodology 200 begins at 202, and at 204, liquid phases of a matrix precursor and a catalyst for a sol-gel reaction are mixed with an ionic liquid. Reaction of the precursor with the catalyst causes formation of a solid-phase matrix. The precursor can be one of multiple precursors that are together mixed with the catalyst to yield the reaction that causes formation of the solid-phase matrix. As the solid-phase matrix forms due to reaction of the one or more precursors with the catalyst, the ionic liquid present in the sol is trapped in pores. In addition to the solid-phase matrix, the reaction yields one or more byproducts such as water or one of various alcohols. Thus, the reaction of the one or more precursors with the catalyst in the presence of the ionic liquid yields a gel that comprises the solid-phase matrix, the ionic liquid, and the one or more byproducts. Before gelation, the sol remains in a substantially liquid phase that can be deposited onto a surface or cast into a mold.

At 206, the gel is dried by way of thermal drying or vacuum drying to remove or otherwise eliminate the byproducts of the precursor-catalyst reaction that forms the solid-phase matrix. After the drying process, the ionic liquid is retained in the pores of the solid-phase matrix, which imparts ion-transport characteristics that are similar to those of liquid electrolytes. At 208, the methodology 200 ends.

Whereas the methodology 200 is suitable for forming solid-state ionogels, ionic liquids that are capable of withstanding the drying processes needed to eliminate precursor-catalyst reaction byproducts are often unsuited for use in certain applications, such as lithium ion batteries. For instance, an ionic liquid can be selected to withstand high temperatures (e.g., employed for thermal drying) and/or low pressures (e.g., employed for vacuum drying) that are used to remove undesirable byproducts. The ionic liquid therefore survives the drying process, preventing collapse of the solid-phase matrix of the ionogel. However, that same ionic liquid may exhibit poor properties in an intended final application for the ionogel, such as slow ion transport, and poor tolerance to low temperatures. Exchange of an existing ionic liquid in an ionogel by a second liquid electrolyte (e.g., by at least partial immersion of the ionogel in the second liquid as at 106) after the ionogel is gelled and dried allows the electrolyte of the ionogel to be tailored to a desired application after undesired byproducts of the precursor-catalyst reaction have been eliminated from the ionogel.

The methods 100, 200 described herein are suitable for forming ionogels of various types including polymeric ionogels wherein the solid-phase matrix comprises a polymer, and inorganic ionogels wherein the solid-phase matrix comprises an inorganic material. A type of the ionogel formed depends upon the precursors and catalyst selected to form the sol-gel. In an exemplary embodiment, an inorganic ionogel having a solid-phase matrix comprising silica can be formed by mixing tetraethylorthosilicate (TEOS) and triethylvinylorthosilicate (VTEOS) precursors with a formic acid catalyst. In another exemplary embodiment, a polymeric ionogel having a solid-phase matrix comprising poly(vinylidene fluoride-co-hexafluoropropylene) can be formed by suspending the poly(vinylidene fluoride-co-hexafluoropropylene) in acetone. Still other ionogels and corresponding precursor-catalyst chemistries are contemplated as being within the scope of the present disclosure.

In various non-limiting exemplary embodiments, a silica-based ionogel is formed by mixing liquid phases of a >99% TEOS solution precursor, a 97% VTEOS solution precursor, a formic acid catalyst, and an ionic liquid electrolyte produced from LiFSI and 99.5% solution of 1-butyl-1-methylpyrrolidinium bis(trifluoromethylsulfonyl)imide ($PYR_{14}$ TFSI). In the exemplary embodiment, a sol is formed from equal volumetric ratios of the TEOS and VTEOS precursors and the formic acid catalyst. A sol-gel is formed by mixing the sol with the LiFSI/$PYR_{14}$ TFSI ionic liquid in a 60:40 volumetric ratio of the sol to the ionic liquid. The sol-gel can be deposited onto a substrate or cast into a mold. The sol-gel, whether deposited or cast, is dried by thermal or vacuum drying to eliminate byproducts of the precursor-catalyst reaction, yielding a solid state ionogel.

In one embodiment, the silica-based ionogel formed as described above is treated to exchange the LiFSI/$PYR_{14}$ TFSI ionic liquid with a solution of 1M $LiClO_4$ dissolved in propylene carbonate. In this embodiment, the ionogel is at least partially immersed in the $LiClO_4$/propylene carbonate solution. In another embodiment, the silica-based ionogel is treated to exchange the ionic liquid with a solution of 1M LiFSI DOL/DME, wherein the DOL and DME are present at a 1:1 volumetric ratio. In any of these embodiments, the silica-based ionogel is immersed in a desirably-exchanged electrolyte solution for at least 3 hours, at least 2 hours, or at least 1 hour. Further, in any of these embodiments, the silica-based ionogel is immersed in a different fresh (i.e., not previously used for immersion) quantity of the desirably exchanged solution a plurality of at least 5 times, at least 3 times, or at least 2 times. Stated differently, the ionogel can be successively immersed in at least five different batches of the desirably exchanged solution, in at least three different batches of the desirably exchanged solution, or at least two different batches of the desirably exchanged solution.

While certain exemplary liquids have been described herein as being suitable for exchange into an ionogel that includes a first liquid, it is to be understood that substantially any liquid can be exchanged into the pores of the solid-phase matrix of an ionogel by immersion of the ionogel in a quantity of the liquid. In further exemplary embodiments, the liquid exchanged into the ionogel by partial immersion of the ionogel can be or include carbonate-based, ether-based, or localized high-concentration electrolytes. By way of example, and not limitation, the liquid exchanged into the ionogel can be or include a mixture of ethylene carbonate/diethyl carbonate. In some specific embodiments, the liquid can include a mixture of ethylene carbonate/diethyl carbonate at a 1:1 vol %.

Figure 3:
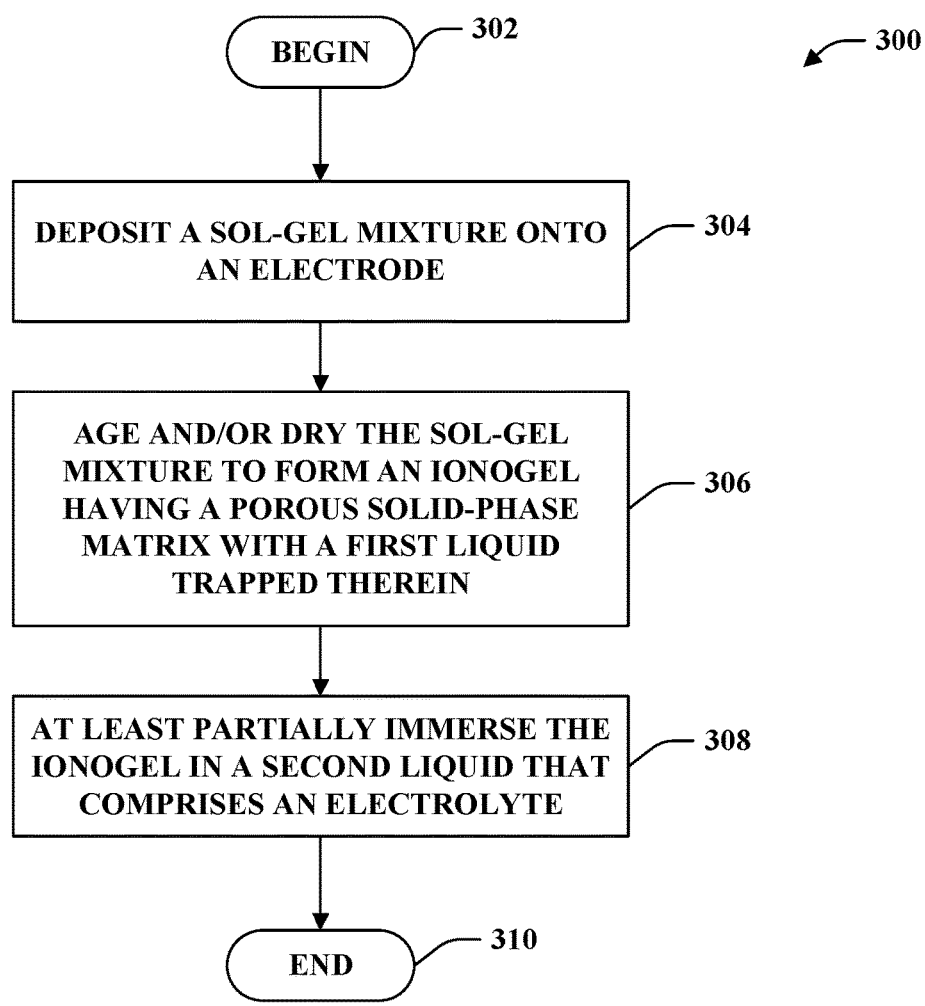
FIG. 3 is a flow diagram that illustrates an exemplary methodology for making a battery that includes an ionogel electrolyte.

Referring now to FIG. 3, an exemplary methodology 300 for forming a battery that includes an ionogel SSE is illustrated. At 302, the methodology 300 begins, and at 304, a sol-gel mixture is deposited onto an electrode. The sol-gel mixture can include substantially any combination of precursors, catalysts, and ionic liquids suitable for forming an ionogel that has a solid-phase matrix having pores with the ionic liquid disposed therein. By way of example, and not limitation, in embodiments wherein the battery desirably includes a polymer-based SSE, the matrix components and ionic liquids are configured to facilitate a reaction that yields a polymeric solid-phase matrix. In another example, in embodiments wherein the battery desirably includes a silica-based SSE, the precursors can include TEOS and VTEOS, and the catalyst can include formic acid.

The electrode is configured to accept ions during charging and discharging of a battery. Accordingly, a composition of the electrode depends upon an ion based upon which the battery is designed to operate. In various embodiments wherein the methodology 300 is employed to make a lithium-ion battery, the electrode can comprise one or more of $LiFePO_4$ (LFP), lithium titanate (LTO), lithium foil, conductive carbon, or polyvinylidene fluoride (PVDF). In one specific exemplary embodiment, an LFP-based electrode is formed of a slurry consisting of 80 wt % LFP, 10 wt % conductive carbon, and 10 wt % PVDF suspended in NMP and then cast onto a carbon-coated aluminum foil. In another specific exemplary embodiment, a LTO-based electrode is formed of a slurry consisting of 80 wt % LTO, 10 wt % conductive carbon, and 10 wt % PVDF suspended in NMP and then cast onto a carbon-coated aluminum foil. However, it is to be understood that the electrode can be formed of substantially any composition that is capable of accepting ions that are exchanged between the anode and the cathode during charging/discharging of the battery.

The sol-gel mixture is deposited onto the electrode at 304 in a liquid phase, thereby facilitating wetting of the sol-gel mixture to the electrode. The sol-gel mixture can be deposited at 304 by any of various means including, but not limited to, spin-coating, dip-coating, jet printing, or the like. Since the sol-gel mixture is in a liquid phase before deposition on the electrode at 304, the sol can be deposited on the electrode with a substantially uniform wetting and spatial distribution, providing low interfacial resistance between the electrode and an ionogel formed by the sol-gel mixture.

At 306, the sol-gel mixture is aged and/or dried to form an ionogel that has a porous solid-phase matrix with a first liquid trapped therein. The solid-phase matrix is formed from reaction of precursors and catalysts in the sol-gel mixture, and has a material composition dependent upon the precursors and catalysts. The first liquid can include, for example, an ionic liquid that is included in the sol-gel mixture deposited at 304. Prior to drying, the sol-gel mixture can additionally have one or more precursor-catalyst reaction byproducts disposed therein. For instance, prior to drying the sol-gel at 306, the sol-gel mixture can include water or an alcohol yielded by reaction of the precursors and the catalysts. Drying the sol-gel mixture 306 can include a vacuum drying step, a thermal drying step, or a combination thereof to remove such reaction byproducts.

At 308, the ionogel is at least partially immersed in a second liquid that comprises an electrolyte. The second liquid can be, for example, a liquid that has an electrolyte dissolved therein. The electrolyte in the second liquid can be selected to have high ionic conductivity with respect to ions accepted by the electrode during charging/discharging of the battery, such that when the second liquid is disposed in the pores of the solid-phase matrix, the ions are conducted across the ionogel.

The second liquid can be soluble in the first liquid, or the first liquid can be soluble in the second liquid. Due to dissolving of the second liquid in the first liquid or the first liquid in the second liquid, at least a portion of the first liquid in the pores of the solid-phase matrix is displaced by the second liquid. Thus, an initial ionic liquid that is used to initially form the ionogel and that is configured to withstand the curing of the sol-gel mixture at 306 can be replaced by a liquid electrolyte that may be more suitable for use in a battery. For example, the ionogel can be at least partially immersed in a carbonate-based electrolyte liquid such as $LiClO_4$ dissolved in propylene carbonate at 308 in embodiments wherein the ionogel is intended for use in a lithium-ion battery having a high power density (e.g., greater than 400 W/kg, greater than 425 W/kg, or greater than 450 W/kg). In another example, the ionogel can be at least partially immersed in an ether-based electrolyte liquid such as LiFSI dissolved in a mixture of DOL and DME in embodiments wherein the ionogel is intended for use in a lithium ion battery adapted for low temperature operation (e.g., at temperatures less than 0° C., at temperatures less than −20° C., or at temperatures less than −40° C.). The methodology 300 completes at 310.

FIG. 4 is a pictorial diagram of an exemplary process 400 for forming a battery with an ionogel electrolyte. In a first processing step, one or more precursors are mixed with a catalyst and an ionic liquid in a vessel 402. Mixing of the precursors, the catalyst, and the ionic liquid results in formation of a liquid phase sol 404. Once dried, the sol-gel forms an ionogel that comprises a solid-phase matrix having pores formed therein, wherein the ionic liquid is trapped in the pores of the solid-phase matrix.

Prior to drying, and in a next processing step, the liquid phase sol 404 is deposited on an electrode 406, thereby forming a layer 408 of the gel 404 on the electrode 406. The layer 408 of the gel 404 on the electrode 406 can be formed, for example, by spin-coating. In a subsequent processing step, a second electrode 410 is lowered onto the gel layer 408 such that the gel layer 408 is disposed between the first electrode 406 and the second electrode 410. The second electrode 410 can further optionally have a second layer of the gel 412 deposited thereon. In these embodiments, the second electrode 410 is lowered onto the first gel layer 408 such that the first gel layer 408 and the second gel layer 412 mix to form a single layer 416 disposed between the two electrodes 406, 410.

The electrodes 406, 410 with the gel layer 416 disposed between them make up a battery assembly 418. In a next processing step, the battery assembly 418 is heated and/or subjected to a vacuum in a dryer 420 in order to dry the gel layer 416, forming an ionogel 422. By aging and drying the gel layer 416 subsequent to joining of the electrodes 406, 410 with the layer 416 disposed between them, good contact between the gel layer 416 and the electrodes 406, 410 is maintained, yielding a low interfacial resistance at interfaces of the electrodes 406, 410 and the ionogel 422.

Subsequent to drying, the ionogel 422 has a first liquid disposed within pores of the solid-phase matrix of the ionogel 422. In a next processing step, the battery assembly 418 with the dried ionogel 422 is immersed in a second liquid 424 that is desirably exchanged into the pores of the ionogel 422. In an exemplary embodiment, the second liquid 424 is soluble in the first liquid disposed within the pores of the ionogel 422, and the second liquid 424 dissolves into the first liquid, thereby displacing at least a portion of the first liquid in the pores of the ionogel 422.

The battery assembly 418 can be configured to function as a lithium-ion battery. In a non-limiting example, the first electrode 406 and the second electrode 410 can each be configured to accept lithium ions during a charge/discharge cycle of the battery assembly 418. The second liquid 424 can include a lithium-based electrolyte that is configured to allow lithium ions to cross the ionogel 422 between the first electrode 406 and the second electrode 410 when the second liquid 424 is disposed within the pores of the ionogel 422. In an exemplary embodiment, the second liquid 424 comprises a lithium salt in solution with one or more of DOL or DME.

FIG. 5 illustrates another exemplary methodology 500 for forming an application-tailored ionogel. The methodology 500 begins at 502, and at 504, an ionogel is formed such that a first liquid is disposed within pores of the ionogel. At 506, the ionogel is at least partially immersed in a second liquid, wherein immersion of the ionogel in the second liquid causes displacement of the first liquid by the second liquid. Whereas in some embodiments, a liquid that is desirably exchanged with the first liquid in the pores of the ionogel is soluble in the first liquid (or vice versa), in other embodiments, it may be that neither the desirably exchanged liquid or the first liquid is soluble in the other. Thus, at 506, the second liquid may be selected to be an intermediate liquid that each of the first liquid and the final liquid that is desirably exchanged into the pores of the ionogel is soluble in. At 508, the ionogel is at least partially immersed in a third liquid that is different from the second liquid, wherein the immersion of the ionogel in the third liquid causes displacement of the second liquid by the third liquid.

For purposes of clarity, in exemplary embodiments the first liquid can be a liquid initially present in the sol-gel mixture used to form the ionogel, the third liquid can be a liquid that is desirably exchanged into the ionogel, and the second liquid is an intermediate liquid in which both the first liquid and the third liquid are soluble. Successive immersion of the ionogel in the second liquid and the third liquid causes displacement of the first liquid by the second liquid due to solubility of the first liquid in the second liquid, and subsequent displacement of the second liquid by the third liquid due to solubility of the third liquid in the second liquid. Therefore, according to the methodology 500, a liquid can be exchanged into an ionogel even if it is not soluble in the liquid initially used in the sol-gel mixture to form the ionogel, provided there is some intermediate liquid in which the initial liquid and the desirably exchanged liquid are soluble. The methodology 500 completes at 510.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Unless the context indicates otherwise, all percentages and averages are by weight. If not specified above, properties mentioned herein may be determined by applicable ASTM standards, or if an ASTM standard does not exist for the property, the most commonly used standard known by those of skill in the art may be used. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A battery, comprising:
   a first electrode configured to accept lithium ions;
   a second electrode configured to accept lithium ions; and
   an ionogel disposed between the first electrode and the second electrode, wherein a first liquid was used to form the ionogel, and further where the ionogel comprises:
      a solid-phase matrix having pores formed therein; and
      a second liquid disposed within the pores of the solid-phase matrix, the second liquid comprising a lithium-based electrolyte in solution with at least one of 1,3 dioxolane (DOL), or dimethyl ether (DME), where the second liquid displaced the first liquid that was used to form the ionogel.

2. The battery of claim 1, wherein the first electrode comprises at least one of LiFePO$_4$ (LFP), lithium titanate (LTO), conductive carbon, polyvinylidene fluoride (PVDF), or n-methyl-2-pyrrolidone (NMP).

3. The battery of claim 1, wherein the lithium-based electrolyte comprises lithium bis(fluoromethanesulfonyl) imide.

4. The battery of claim 1, wherein the solid-phase matrix comprises at least one of tetraethylorthosilicate (TEOS) and triethylvinylorthosilicate (VTEOS).

5. The battery of claim 1, wherein the solid-phase matrix comprises poly(vinylidene fluoride-co-hexafluoropropylene).

* * * * *